(12) United States Patent
Huang et al.

(10) Patent No.: US 10,295,715 B2
(45) Date of Patent: *May 21, 2019

(54) POLARIZER AND FABRICATION METHOD THEREOF, DISPLAY PANEL, AND DISPLAY DEVICE

(71) Applicants: Shanghai Tianma Micro-electronics Co., Ltd., Shanghai (CN); Tianma Micro-electronics Co., Ltd., Shenzhen (CN)

(72) Inventors: Zhongshou Huang, Shanghai (CN); Long Zhang, Xiamen (CN); Zhaokeng Cao, Shanghai (CN)

(73) Assignees: Shanghai Tianma Micro-electronics Co., Ltd., Shanghai (CN); Tianma Micro-electronics Co., Ltd., Shenzhen (CN)

( * ) Notice: Subject to any disclaimer, the term of this patent is extended or adjusted under 35 U.S.C. 154(b) by 79 days.

This patent is subject to a terminal disclaimer.

(21) Appl. No.: 15/013,860

(22) Filed: Feb. 2, 2016

(65) Prior Publication Data

US 2016/0238766 A1 Aug. 18, 2016

(30) Foreign Application Priority Data

Feb. 13, 2015 (CN) .......................... 2015 1 0080252
Mar. 3, 2015 (CN) .......................... 2015 1 0095007

(51) Int. Cl.
*G02B 5/20* (2006.01)
*G02B 5/30* (2006.01)
*G02F 1/1335* (2006.01)

(52) U.S. Cl.
CPC ............. *G02B 5/305* (2013.01); *G02B 5/201* (2013.01); *G02B 5/3058* (2013.01); *G02F 1/133528* (2013.01); *G02F 2001/133538* (2013.01)

(58) Field of Classification Search
CPC . G02B 5/20; G02B 5/201; G02B 5/30; G02B 5/3016; G02B 5/3025;
(Continued)

(56) References Cited

U.S. PATENT DOCUMENTS 4,286,843 A * 9/1981 Reytblatt ................ G01L 1/241
356/33
5,310,509 A * 5/1994 Okada ..................... C09B 45/24
252/585

(Continued)

FOREIGN PATENT DOCUMENTS

CN 1339715 A 3/2002
CN 101022949 A 8/2007
(Continued)

OTHER PUBLICATIONS

Hwang, KR 2013-0037126, English language machine translation, created Jul. 5, 2017.*

Primary Examiner — Stephone B Allen
Assistant Examiner — Adam W Booher
(74) Attorney, Agent, or Firm — Anova Law Group, PLLC

(57) ABSTRACT

A polarizer and fabrication method thereof, a display panel and a display device are provided. The polarizer includes an organic film capable of being aligned during a polarization treatment. The organic film includes at least one first region having a first polarization axis and at least one second region having a second polarization axis. A direction of the first polarization axis is different from a direction of the second polarization axis.

19 Claims, 13 Drawing Sheets

(58) Field of Classification Search
CPC .... G02B 5/3033; G02B 5/3041; G02B 5/305; G02B 5/3058; G02B 27/28; G02F 1/133528; G02F 2001/133531; G02F 2001/133543; G02F 2001/133538
See application file for complete search history.

(56) References Cited

U.S. PATENT DOCUMENTS

| | | | |
|---|---|---|---|
| 5,602,661 A | 2/1997 | Schadt et al. | |
| 6,049,428 A * | 4/2000 | Khan | C07C 309/44 359/487.02 |
| 2003/0062532 A1 * | 4/2003 | Lee | G02F 1/133514 257/89 |
| 2005/0275943 A1 * | 12/2005 | Sugimura | G02B 5/305 359/487.02 |
| 2006/0232860 A1 * | 10/2006 | Kozenkov | G02B 5/3033 359/487.02 |
| 2009/0046230 A1 * | 2/2009 | Sakurai | G02F 1/133345 349/138 |
| 2011/0267439 A1 * | 11/2011 | Chen | G02B 27/2264 348/53 |
| 2012/0273780 A1 * | 11/2012 | Yamazaki | H01L 27/1225 257/43 |
| 2014/0354930 A1 * | 12/2014 | Hirato | G02F 1/133707 349/123 |
| 2015/0042922 A1 * | 2/2015 | Kawahira | G02F 1/133555 349/61 |
| 2015/0168623 A1 * | 6/2015 | Beon | G02B 1/10 257/40 |
| 2016/0024383 A1 * | 1/2016 | Kawamura | C09K 19/12 252/299.61 |
| 2016/0215217 A1 * | 7/2016 | Akiyama | C09K 19/2021 |
| 2016/0238927 A1 * | 8/2016 | Liu | G03F 1/50 |
| 2016/0357068 A1 * | 12/2016 | Yang | G02F 1/133504 |

FOREIGN PATENT DOCUMENTS

| | | |
|---|---|---|
| CN | 101261391 A | 9/2008 |
| CN | 101825733 A | 9/2010 |
| CN | 102272658 A | 12/2011 |

* cited by examiner

POLARIZER AND FABRICATION METHOD THEREOF, DISPLAY PANEL, AND DISPLAY DEVICE

CROSS-REFERENCES TO RELATED APPLICATIONS

This application claims the priority of Chinese patent application No. CN201510080252.4, filed on Feb. 13, 2015 and CN201510095007.0, filed on Mar. 3, 2015, the entire content of which is incorporated herein by reference.

FIELD OF THE DISCLOSURE

The present disclosure relates to display technology and, more particularly, relates to a polarizer and fabrication techniques thereof, corresponding display panels and display devices.

BACKGROUND

Polarizer is one of the key components in a display device. FIG. 1 illustrates a cross-sectional view of a conventional polarizer. As shown in FIG. 1 the conventional polarizer includes a release film 101, an adhesive layer 102, a first protective film 103, a polarizing film 104, a second protective film 105 and a protective layer 106. Generally speaking, the first protective film 103 and the second protective film 105 are made of tri-cellulose acetate (TAC), and the polarizing film 104 are made of polyvinyl alcohol (PVA).

Conventional polarizing films may be classified into two categories: iodine-type polarization film and dye-type polarization film. The iodine-type polarization film is fabricated by stretching iodine-doped PVA, and the dye-type polarization film is fabricated by stretching dichroic-organic-dye-doped PVA. The polarizing film absorbs and transmits the incident light, particularly, transmits the incident light polarized in one direction while absorbs the incident light polarized in another direction. Thus, the polarization film exhibits a polarizing capability. Due to the material properties of the polarization film and the fabrication techniques of the polarizers, currently one polarizer may often exhibit the polarizing capability in only one polarization direction.

Displays usually require a wide viewing angle, which is closely related to the polarization direction of the polarizing film. Currently, displays often have to rely on other approaches for a wide viewing angle, such as multi-domain alignments of liquid crystal molecules. Although various fabrication methods of multi-axis polarization films have been studied, these fabrication methods often are not very effective. It may be difficult to find a fabrication method which is applicable with the display fabrication techniques. For example, a metal-slit-array based polarizer having different polarization directions may only be fabricated by employing high precision components, such as photomasks, which are not achievable in general display manufacturing.

The disclosed polarizer structure and fabrication method are directed to solve one or more problems in the art.

BRIEF SUMMARY OF THE DISCLOSURE

One aspect of the present disclosure provides a polarizer. The polarizer includes an organic film capable of being aligned during a polarization treatment. The organic film includes at least one first region having a first polarization axis and at least one second region having a second polarization axis. A direction of the first polarization axis is different from a direction of the second polarization axis.

Another aspect of the present disclosure provides a display panel. The display panel includes a first substrate, a second substrate arranged opposite to the first substrate, and a polarizer disposed on at least one of the first substrate and the second substrate. The polarizer includes an organic film capable of being aligned during a polarization treatment. The organic film includes at least one first region having a first polarization axis and at least one second region having a second polarization axis. A direction of the first polarization axis is different from a direction of the second polarization axis.

Another aspect of the present disclosure provides a display device. The display device includes a polarizer. The polarizer includes an organic film capable of being aligned during a polarization treatment. The organic film includes at least one first region having a first polarization axis and at least one second region having a second polarization axis. A direction of the first polarization axis is different from a direction of the second polarization axis.

Another aspect of the present disclosure provides a polarizer fabrication method. The fabrication method includes providing a substrate, and forming a polarizing material layer by coating a polarizing-material doped based-material or a polarizing-material doped based-material precursors on the substrate. The polarizing material layer includes at least one first region and at least one second region. The fabrication method also includes providing a first photomask transparent to the at least one first region, irradiating light or electromagnetic waves having a first polarization direction on the at least one first region, rotating the substrate, such that an angle between the light or the electromagnetic waves and the polarizing material layer is changed. The fabrication method also includes providing a second photomask transparent to the at least one second region, and irradiating the light or the electromagnetic waves having the first polarization direction on the at least one second region.

Another aspect of the present disclosure provides a polarizer fabrication method. The fabrication method includes providing a substrate, and forming a polarizing material layer by coating a polarizing-material doped based-material or a polarizing-material doped based-material precursors on the substrate. The polarizing material layer includes at least one first region and at least one second region. The fabrication method also includes providing a first photomask transparent to the at least one first region, irradiating light or electromagnetic waves having a first polarization direction on the at least one first region, providing a second photomask transparent to the at least one second region, and irradiating light or electromagnetic waves having a second polarization direction on the at least one second region.

Another aspect of the present disclosure provides a polarizer fabrication method. The fabrication method includes providing a substrate, and forming a polarizing material layer by coating a polarizing-material doped based-material or a polarizing-material doped based-material precursors on the substrate. The polarizing material layer includes at least one first region and at least one second region. The fabrication method also includes providing a photomask having at least one third-region corresponding to the at least first region and at least one fourth-region corresponding to the at least one second region, and irradiating light or electromagnetic waves transmitted through the photomask on the at least one first region and the at least one second region. The photomask converts unpolarized light or unpolarized electromagnetic waves incident on the photomask to polarized light or polarized electromagnetic waves, and the light or the electromagnetic waves transmitted through the at least one third-region and the at least one fourth-region have different polarization directions.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

Figure 1:
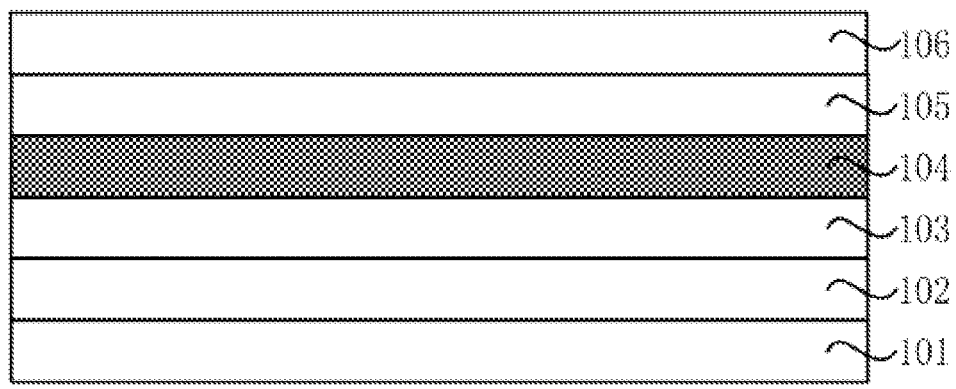
FIG. 1 illustrates a cross-sectional view of a conventional polarizer.
Figure 2:
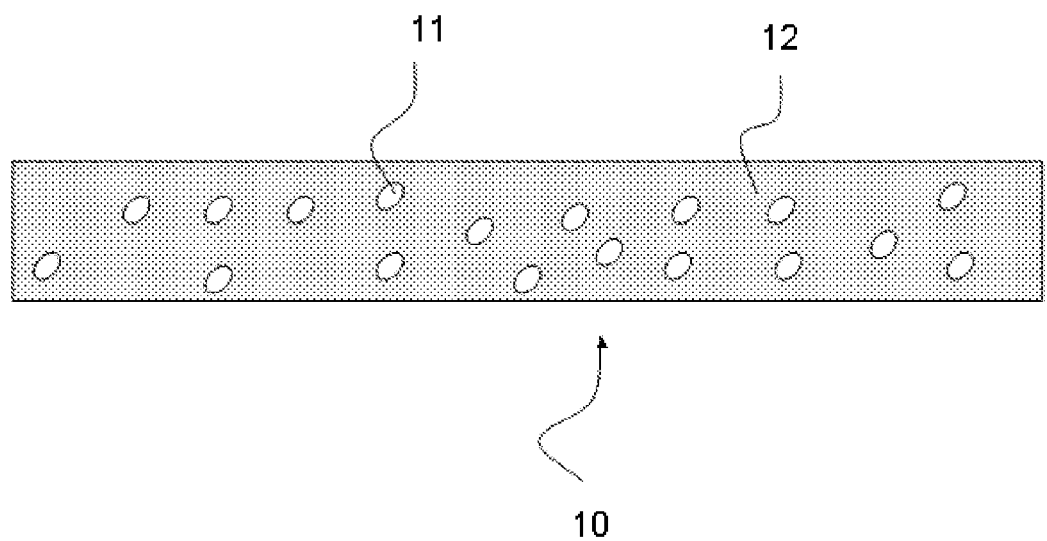
FIG. 2 illustrates a cross-sectional view of an exemplary polarizer consistent with disclosed embodiments.

FIG. 2 shows an exemplary polarizer consistent with the disclosed embodiments. As shown in FIG. 2, the polarizer 10 may include an organic film having a base-material 12 doped with a polarizing-material 11. The polarizing-material 11 may include at least one material capable of being aligned along a certain direction when experiences a high-energy treatment. The high-energy treatment may refer to a treatment of materials employing various forms of energy, such as sound, light, electricity, heat and magnetism. In the disclosed embodiments, the high-energy treatment may include irradiating light or electromagnetic waves on the at least one material capable of being aligned. For example, the polarizing-material 11 may include at least one material having an optical alignment capability.

The polarizing-material 11 may be dichroic organic dyes. Further, the polarizing-material 11 may be azo dichroic organic dye or trans-stilbene type dichroic dye. For example, the polarizing material 11 may include compounds having following representative chemical structural formulas (1) or (2):

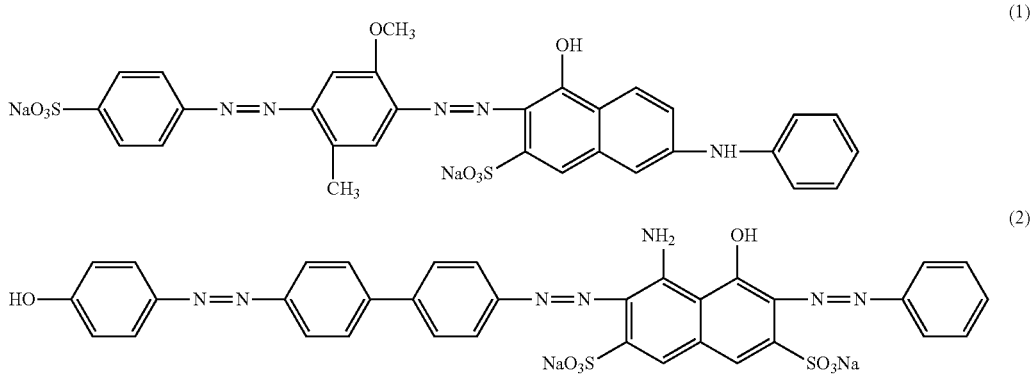

The polarizing-material 11 may also be selected from benzidine, N N'-diphenylurea, (e)-trans-stilbene, 2-naphthyl amines, J-acid and anthraquinonoid and etc., in order to exhibit a polarizing capability.

The base-material 12 may be one or more selected from cellulose triacetate, polyimide, polyamic acid, polystyrenes, cellulose derivatives, polyvinyl chloride, polypropylene, acrylic polymers, polyamides, polyesters, ethylene vinyl acetate and etc.

In the disclosed embodiments, the base-material 12 may be polyimide. Because polyimide may have a higher temperature resistance and a higher humidity resistance than polyvinyl alcohol, the TAC protective layer and the adhesive layer may be removed, and the polarizer thickness may be reduced. The base-material 12 may not need to have the alignment capability under the irradiation of the light or the electromagnetic waves, for example, the optical alignment capability, enabling more choices and strong applicability in the manufacturing.

In the disclosed embodiments, the dichroic organic dyes may be directionally aligned when irradiated by the polarized light or the polarized electromagnetic waves. Because of the dichroic property, when irradiated by unpolarized light, the dichroic organic dyes may transmit the incident light polarized in one direction and, meanwhile, block the incident light polarized in another direction. That is, the dichroic organic dyes may have a polarizing capability, and can further form a polarizer after a baking process. Depending on different materials, an absorption axis of the polarizer may be perpendicular or parallel to the polarization axis of polarized light.

In the existing techniques, the polarizing capability of the conventional polarizer may be enabled by stretching the conventional polarizer. Because the stretching is only in one direction, the conventional polarizer may have only one polarization direction. Unlike the conventional polarizer, in the present disclosure, the polarization directions of the disclosed polarizers may be determined through irradiating the organic film having the base-material and the polarizing-material with light or electromagnetic waves. For example, through irradiating different regions of the organic film with light or electromagnetic waves having different polarization directions, the formed polarizer may have a different polarization axis in different regions.

The disclosed polarizer may include at least one first region and one second region, in which a polarization axis of the first region may be different from a polarization axis of the second region. In certain embodiments, the polarizer may have two, or more than two regions. Each region may have a different polarization axis, or some regions may have a same polarization axis and some regions may have a different polarization axis, for various practical applications. In certain other embodiments, the polarizer 10 may only a first-direction and a second-direction.

In the present disclosure, the above-mentioned polarizer having different polarization directions in different regions is defined as a multi-axis polarizer or regionalized polarizer. The above-mentioned materials (i.e., the base-material and the polarizing-material) and structures (i.e., the organic film including the base-material and the polarizing-material) may be directly adopted to fabricate multi-axis polarizers, simplifying the fabrication process and reducing the product cost. Because the stretching may not be needed to enable the polarizing capability in the multi-axis polarizer, the possibility of warpage may be reduced and the reliability of the polarizer may be improved.

Further, electron donor groups or electron acceptor groups may be incorporated at the molecular terminals of the azo dyes, so as to achieve a more precise polarization direction variation among the regions in the polarizer. The accuracy and stability of the multi-axis polarizers may be further improved. This is because incorporating electron donor groups or electron acceptor groups may lead to an increased dichroic ratio. The polarizing-material 11 may include compounds having following chemical structural formula:

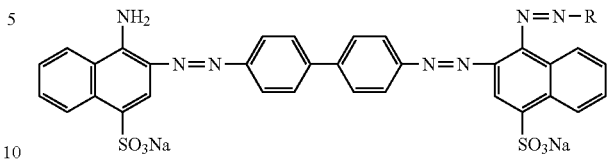

where R may be

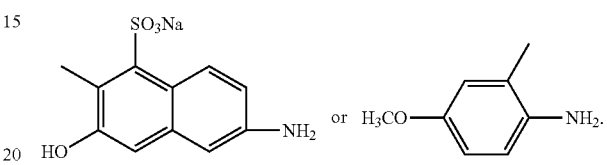

It should be noted that, the base-material 12 and/or the polarizing-material 11 may include one or more of the above-mentioned materials or similar materials, which is within the scope of the present invention.

In another embodiment, the polarizer 10 may include a base-material 12 doped with a polarizing-material 11, as shown in FIG. 2. The polarizing-material 11 may include one or more selected from azo dyes, anthraquinone dyes, biphenyl dyes, tri-phenyl methane dyes and derivatives, single or multi-methane dyes, polycyclic dyes and trans-stilbene dyes. Further, the dichroic ratio of the polarizing material 11 is larger than 7.

The bases-material 12 may include at least one material capable of being aligned along a certain direction when experiences the high-energy treatment. The high-energy treatment may refer to a treatment of materials employing various forms of energy, such as sound, light, electricity, heat and magnetism. In the disclosed embodiments, the high-energy treatment may include irradiating light or electromagnetic waves on the at least one material capable of being aligned. For example, the base-material 12 may include at least one material having the optical alignment capability.

The base-material 12 may be polyimide. Because polyimide may have a higher temperature resistance and a higher humidity resistance than polyvinyl alcohol, the TAC protective layer and the adhesive layer may be removed, and the polarizer thickness may be reduced.

Further, the base-material 12 may be polyimide having cyclobutane groups, which may have desired optical alignment capability. When exposed to light or electromagnetic waves, polyimide having cyclobutane groups may generate a specific orientation. During the alignment formation of the polyimide, the dichroic dyes in the polarizing-material 11 may also be orientated accordingly to exhibit a certain alignment direction. After a baking process, the base-material 12 and the polarizing-material 11 may form a polarizer. Because the stretching may not be needed to enable the polarizing capability, the reliability of the polarizer may be improved. Further, the possibility of warpage may be reduced and the durability may be improved.

In addition, the base-material 12 may also be selected from optical alignment materials having azo groups and optical alignment materials having poly cinnamoyl derivatives. The base-material 12 may include one or more optical alignment materials. Further, because the polarizer can work when at least one of the base-material 12 and the polarizing-material 11 includes at least one material having the optical alignment capability. Thus, the polarizing-material 11 may not need to have the optical alignment capability, enabling more choices and strong applicability in the manufacturing.

In the existing techniques, the polarizing capability of the conventional polarizer may be enabled by stretching the conventional polarizer. Because the stretching is only in one direction, the conventional polarizer may have only one polarization direction. Unlike the conventional polarizer, in the present disclosure, the polarization directions of the disclosed polarizers may be determined through irradiating the organic film having the base-material and the polarizing-material with light or electromagnetic waves. For example, through irradiating different regions of the organic film with light or electromagnetic waves having different polarization directions, the formed polarizer may have a different polarization axis in different regions.

It should be noted that, the base-material 12 and/or the polarizing-material 11 may include one or more of the above-mentioned materials or similar materials, which is within the scope of the present invention.

In another embodiment, the polarizer 10 may include a base-material 12 doped with a polarizing-material 11, as shown in FIG. 2. The polarizing-material 11 and the base-material 12 may each include at least one material capable of being aligned along a certain direction when experiences the high-energy treatment. The high-energy treatment may refer to a treatment of materials employing various forms of energy, such as sound, light, electricity, heat and magnetism. In the disclosed embodiments, the high-energy treatment may include irradiating light or electromagnetic waves on the at least one material capable of being aligned. For example, the polarizing-material 11 and the base-material 12 may each include at least one material having the optical alignment capability, respectively.

The polarizing-material 11 may be dichroic organic dyes. Further, the polarizing-material 11 may be azo dichroic organic dye or trans-stilbene type dichroic dye. For example, the polarizing material 11 may include compounds having following representative chemical structural formulas (1) or (2):

The base-material 12 may be polyimide, optical alignment materials having azo groups, optical alignment materials having poly cinnamoyl derivatives and etc. Further, the base-material 12 may be polyimide having cyclobutane groups. In the present disclosure, the polarization directions of the disclosed polarizers may be determined through irradiating the organic film having the base-material and the polarizing-material with light or electromagnetic waves. That is, through irradiating different regions of the organic film with light or electromagnetic waves having different polarization directions, the formed polarizer may have a different polarization axis in different regions.

The disclosed polarizer may include at least a first region and a second region, in which a polarization axis in the first region may be different from a polarization axis in the second region. In certain other embodiments, the polarizer may have two, or more than two regions. Each region may have a different polarization direction, or according to practical applications, some regions may have a same polarization direction while some regions may have different polarization directions. In the present disclosure, the above-mentioned polarizer having different polarization directions in different regions is defined as a multi-axis polarizer or a regionalized polarizer.

When both the polarizing-material 11 and the base-material 12 have the optical alignment capability, the formed polarizer may exhibit a significant improved performance as compared to the polarizer in which only one of the polarizing-material 11 and the base-material 12 has the optical alignment capability. The reason may be explained as follows.

Under light or electromagnetic waves exposure, the polarizing-material 11 may align with the polarization axis of the light or the electromagnetic wave and, meanwhile, the base-material 12 may also align with the polarization axis of the light or electromagnetic waves. The base-material 12 may typically be polymers while the polarizing-material 11 may typically be small molecules. During the alignment process, the base-material 12 may guide the alignment of the polarizing-material 11 and, meanwhile, the polarizing-material 11 may have a synergistic effect on the alignment of the base-material 12. Thus, both the polarizing-material 11 and the base-material 12 may be more accurately aligned.

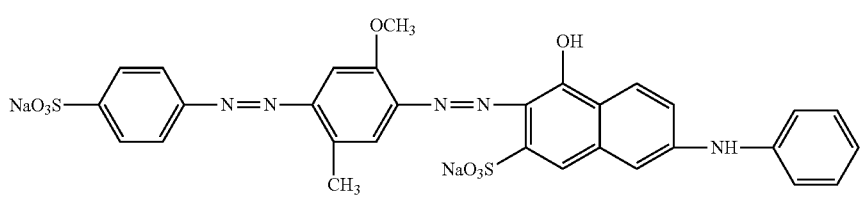

(1)

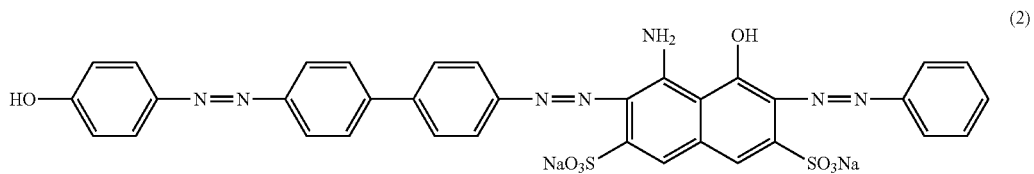

(2)

The polarizing-material 11 may also be selected from benzidine, N,N'-diphenylurea, (e)-trans-stilbene, 2-naphthyl amines, J-acid and anthraquinone and etc., for compensating the polarization degree and the hue of the polarizer.

The polarization directions in different regions of the multi-axis polarizer may be precisely set to achieve the required polarization directions. Further, the multi-axis polarizer may have a desired regionalization accuracy and stability.

Figure 3:
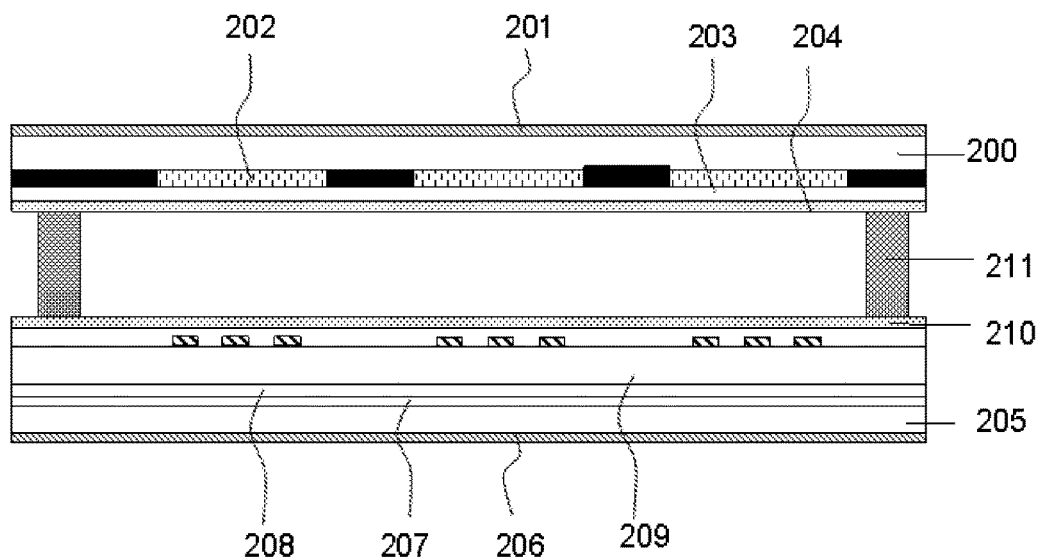
FIG. 3 illustrates a cross-sectional view of an exemplary display panel consistent with disclosed embodiments.

FIG. 3 illustrates a cross-sectional view of an exemplary display panel consistent with disclosed embodiments. The display panel may include a color film (CF) substrate 200 and an array substrate 205 (TFT substrate). The CF substrate 200 may have an inner surface and an outer surface and, similarly, the TFT substrate 205 may also have an inner surface and an outer surface. The inner surface of the CF substrate 200 may be facing the inner surface of the array substrate 205. Liquid crystals (not show in FIG. 3) may be disposed between the CF substrate 200 and the TFT substrate 205.

Frame adhesive 211 may be used to bond the CF substrate 200 and the TFT substrate 205. Further, the CF substrate 200 may include a color film 202 having a plurality of color filters. The color film 202 may have spacing between the adjacent color filters, and a black matrix may be disposed on the spacing.

Further, a first organic layer 203 may be disposed on the color film 202 and the black matrix. The first organic layer 203 may be an overcoat layer, and the first organic layer 203 may be made of resin. A first alignment layer 204 may be disposed on the first organic layer 203. The first alignment layer 204 may be made of polyimide, and may be capable of being aligned under light or electromagnetic wave irradiation. A first polarizer 201 may be disposed on the outer surface of the CF substrate 200.

The TFT substrate 205 may include a plurality of pixel units, a gate layer 207, a TFT layer 208, a second organic layer 209 and a second alignment layer 210. The TFT layer 208 may include a source electrode, a drain electrode, and a semiconductor layer. The second organic layer 209 may be made of resin. The second alignment layer 210 may be made of polyimide, and may be capable of being aligned under light or electromagnetic wave irradiation.

Further, a second polarizer 206 may be disposed on the outer surface of the TFT substrate 205. Both the first polarizer 201 and the second polarizer 206 may be multi-axis polarizers consistent with the disclosed embodiment.

Figure 4:
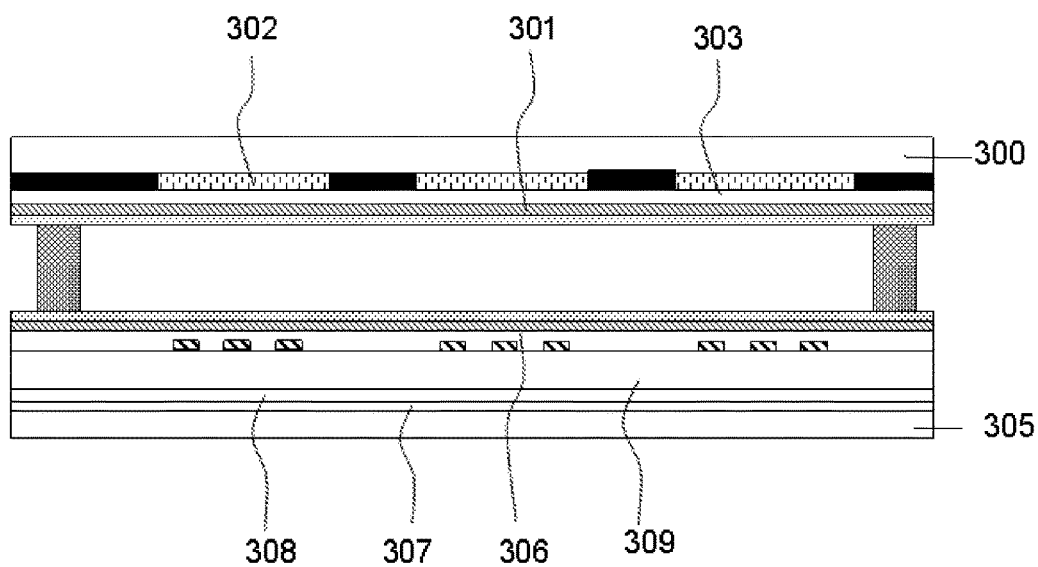
FIG. 4 illustrates a cross-sectional view of another exemplary display panel consistent with disclosed embodiments.

FIG. 4 illustrates a cross-sectional view of another exemplary display panel consistent with disclosed embodiments. The display panel may include a color film (CF) substrate 300 and an array substrate 305 (TFT substrate). The CF substrate 300 may have an inner surface and an outer surface, similarly, the TFT substrate 305 may also have an inner surface and an outer surface. The inner surface of the CF substrate 300 may be facing the inner surface of the array substrate 305. The CF substrate 300 may include a color film 302 and a first organic layer 303. The TFT substrate 305 may include a plurality of pixel units, a gate layer 307, a semiconductor layer 308 and a second organic layer 309.

Further, a first polarizer 301 may be disposed on the inner surface of the CF substrate 300. Particularly, the first polarizer 301 may be disposed above the first organic layer 303. That is, the first polarizer 301 may be closer to the liquid crystals than the first organic layer 303. A second polarizer 306 may be disposed on the inner surface of the TFT substrate 305. Particularly, the second polarizer 306 may be disposed above the second organic layer 309. That is, the second polarizer 306 may be closer to the liquid crystals than the second organic layer 309.

In certain embodiments, only the first polarizer 301 may be disposed on the inner surface of the CF substrate 300 or the second polarizer 306 may be disposed on the inner surface of the TFT substrate 305. In certain other embodiments, the first polarizer 301 may be disposed on the inner surface of the CF substrate 300 and the second polarizer 306 may be also disposed on the inner surface on the TFT substrate 305.

In the existing techniques, the polarizers are often only disposed on the outer surface of the CF substrate and the outer surface of the TFT substrate. Because the conventional polarizers are usually disposed on the display panel through an attaching method, in order to achieve the desired optical performance, the attaching surface may be required to be smooth.

However, in the disclosed embodiments, through doping the polarizer 10 into the base-material 12, the polarizer 10 may be coated on the display panel. Thus, the polarizer may be coated on the inner surface of the CF substrate 300 and the inner surface of the TFT substrate 305. Such a coating method may be used on uneven surfaces, and may minimize the optical performance degradation caused by the attaching error, air bubbles and other defects in conventional polarizers. In addition, the coating method may increase the alignment accuracy between the polarizer and the display panel. Further, attaching the polarizers to the inner side of the display panel may also prevent the polarizers from detachments and scratches. The first polarizer 301 and the second polarizer 306 may be multi-axis polarizers consistent with the disclosed embodiment.

Figure 5:
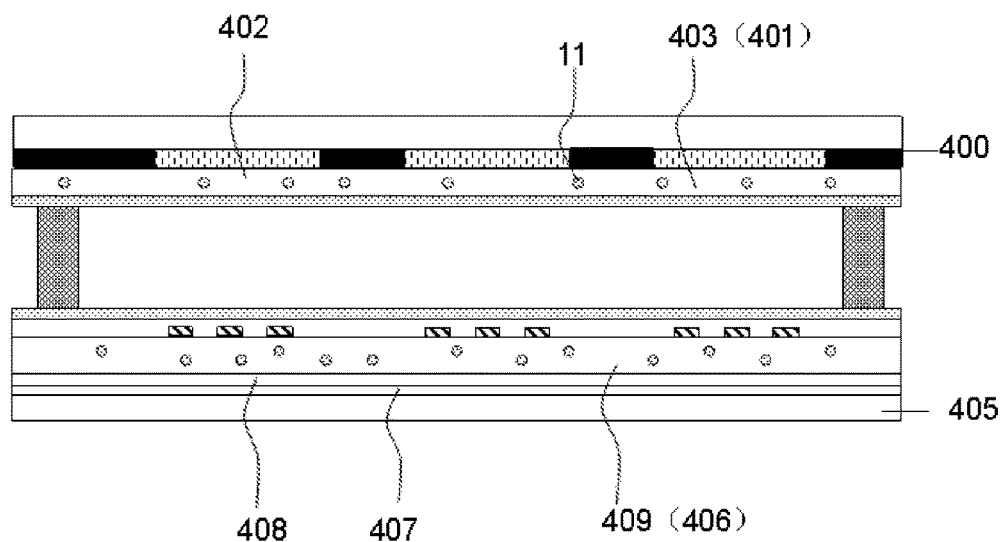
FIG. 5 illustrates a cross-sectional view of another exemplary display panel consistent with disclosed embodiments.

FIG. 5 illustrates a cross-sectional view of another exemplary display panel consistent with disclosed embodiments. The display panel may include a color film (CF) substrate 400 and an array substrate 405 (TFT substrate). The CF substrate 400 may include a color film 402 and a first organic layer 403. The TFT substrate 405 may include a gate layer 407, a semiconductor layer 408 and a second organic layer 409. A first organic layer 403 may be an overcoat layer made of resin. The second organic layer 409 may be a planarization layer made of resin.

Further, the polarizing-material 11 may be doped in the first organic layer 403 or/and the second organic layer 409, i.e., at least one of the first organic layer 403 and the second organic layer 409. The polarizing-material 11 may be dichroic dyes having the optical alignment capability, which may be aligned under light or electromagnetic wave irradiation and accordingly function like a polarizer.

The base-material 12 may be doped into the first organic layer 403 or/and the second organic layer 409, and the base-material 12 may be materials having the optical alignment capability, such as polyimide. The first organic layer 403 and the second organic layer 409 may be made of polyimide doped with the polarizing-material 11. The polarizing-material 11 may be dichroic dyes having the optical alignment capability.

The first organic layer 403 may also function as a first polarizer 401, and the second organic layer 409 may also function as a second polarizer 406. Such a structure may reduce the manufacturing process steps of the polarizers and improve the production efficiency. Further such a structure may reduce the thickness of the display panel, which means a lighter and thinner display panel.

Similarly, in certain embodiments, the polarizing-material 11 and the base-substrate 12 may be doped into any layer of the display panel. The first polarizer 401 and the second polarizer 406 may be multi-axis polarizers consistent with the disclosed embodiment.

Figure 6:
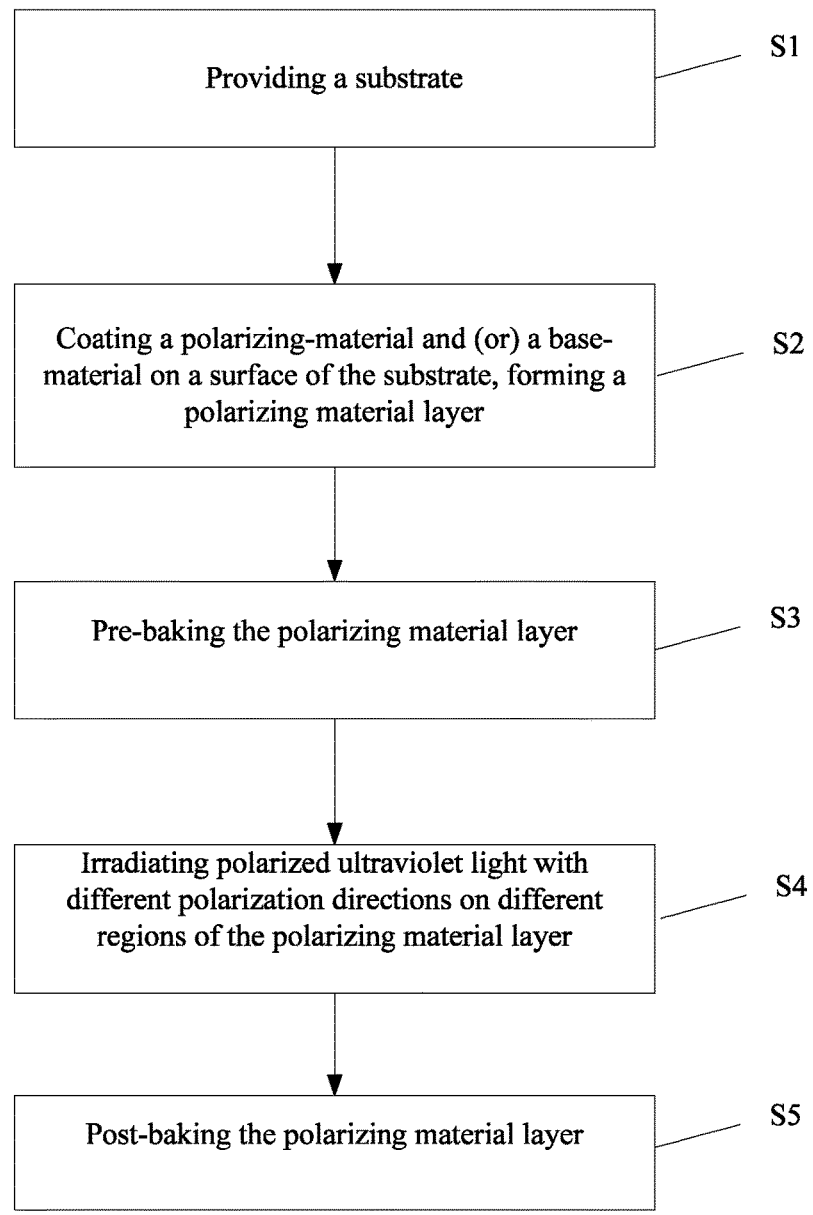
FIG. 6 illustrates a flow chart of an exemplary polarizer fabrication process consistent with disclosed embodiments

FIG. 6 illustrates a flow chart of an exemplary polarizer fabrication process consistent with disclosed embodiments. As shown in FIG. 6, at the beginning of the polarizer fabrication process, a substrate is provided (S1). The substrate may be one layer disclosed in the embodiments, or any layer in a display panel. The substrate may be a TFT substrate, a CF substrate. The substrate may be an overcoat (OC) layer or a planarization layer.

After providing the substrate, polarizing-material 11 or polarizing material 11 mixed with a base-material 12 or polarizing material 11 mixed with precursors of a base-material 12 is coated on a surface of the substrate, forming a polarization material layer (S2). In particular, the polarizing-material 11 and the base-material 12 may be any combination of the materials disclosed in the embodiments.

Further, the polarization material layer is pre-baked or pre-cured (S3). In particular, the pre-baking or the pre-curing temperature may be 90° C.-130° C., and the pre-baking or the pre-curing time may be 60 s-120 s.

Further, the polarization material layer is divided into at least two regions: a first region and a second region. The first region and the second region are irradiated by light or electromagnetic waves with a different polarization direction respectively (S4).

In the disclosed embodiments, the light or the electromagnetic waves may include but not limited to, ultraviolet (UV) light, infrared light, far infrared light, electron beams, X-rays, ion beams, electromagnetic waves, etc. Although UV light is adopted to irradiate the polarization material layer in FIG. 6, any light or electromagnetic waves which is able to align the base material and/or the polarizing material may be adopted to irradiate the polarization material layer.

In particular, the polarized light or the polarized electromagnetic waves may irradiate the pre-baked polarization material layer, causing the polarizing-material or (and) the base-material to align directionally. The energy of the polarized light or the polarized electromagnetic waves may be approximately 300 mj-1000 mj, optionally approximately 500 mj-800 mj. Under the polarized light or the polarized electromagnetic waves with such an energy, the optical alignment capability of the polyimide film may be maximized, which may facilitate the alignment of azo dyes and realize a best polarization performance.

After the light or the polarized electromagnetic wave irradiation, the polarization material layer is post-baked or post-cured (S5). In particular, the post-baking or the post-curing temperature may be approximately 210° C.-230° C., the post-baking or the post-curing time may be approximately 20 min-50 min. Under approximately 130° C. post-baking temperature, the post-baking time may be approximately 120 s. Under approximately 230° C. post-baking temperature, the post-baking time may be approximately 30 min. The manufacturing process of the multi-axis polarizers may be simple and low cost, without the requirement of precision techniques.

In the above-mentioned step S4, different regions in the polarizing material layer may need to be irradiated by light or electromagnetic waves with different polarization directions, which may be realized by the following methods.

Figure 7:
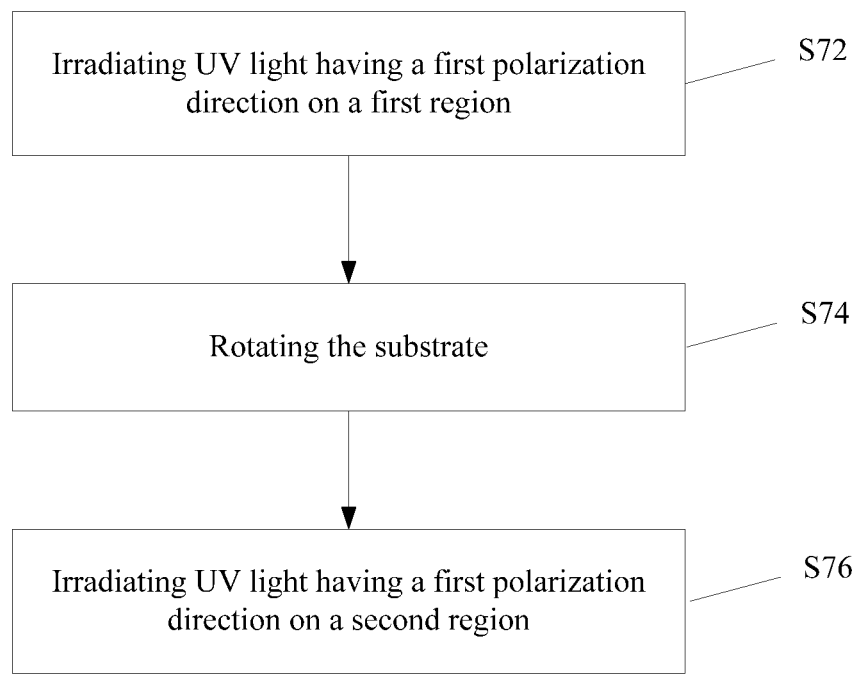
FIG. 7 illustrates a flow chart of an exemplary light or electromagnetic wave irradiation in an exemplary polarizer fabrication process in FIG. 6 consistent with disclosed embodiments.
Figure 8A:
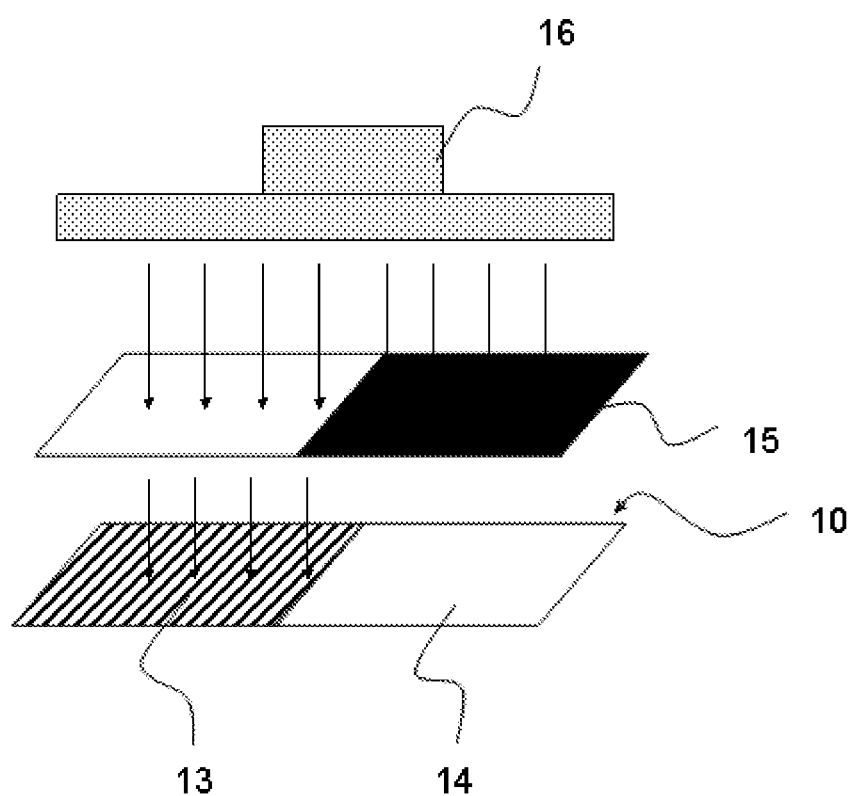
FIGS. 8a-8b illustrate schematics of an exemplary light or electromagnetic wave irradiation in FIG. 7 in an exemplary polarizer fabrication process in FIG. 6 consistent with disclosed embodiments.
Figure 8B:
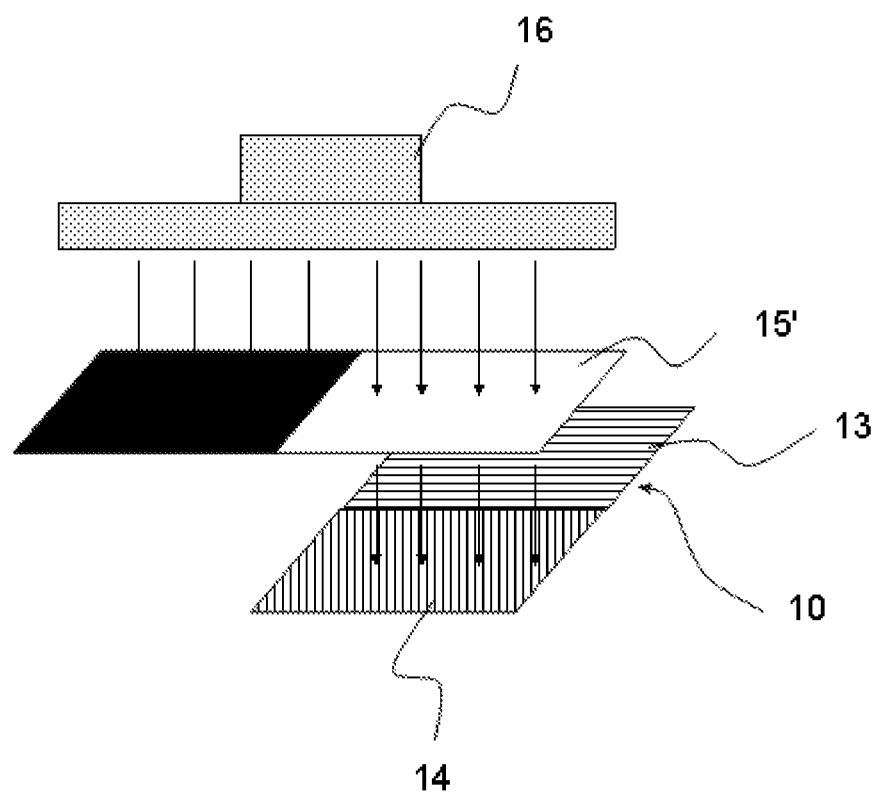

FIG. 7 illustrates a flow chart of an exemplary light or electromagnetic wave irradiation in an exemplary polarizer fabrication process in FIG. 6 consistent with disclosed embodiments. FIGS. 8a-8b illustrate schematics of an exemplary light or electromagnetic wave irradiation in FIG. 7 in an exemplary polarizer fabrication process in FIG. 6 consistent with disclosed embodiments.

As shown in FIG. 7, at the beginning, a first region is exposed under polarized light or polarized electromagnetic waves with a first-polarization direction (S72). As shown in FIG. 8a, a light or electromagnetic source 16 may emit polarized light or polarized electromagnetic waves with a first-polarization direction. The polarizing material layer may include a first region 13 and a second region 14. A photomask 15 may transmit the polarized light or polarized electromagnetic waves irradiating the first region 13, while block the polarized light or polarized electromagnetic waves irradiating the second region 14. Thus, the polarized light or the polarized electromagnetic waves transmitted from the photomask 15 may irradiate the first region 13 and align the polarizing material layer in the first region 13. The first region 13 may a polarization axis along the first-polarization direction.

Returning to FIG. 7, after the light or electromagnetic wave irradiation of the first region, the substrate coated with the polarizing material layer is rotated by a certain angle, and an angle between the polarization direction of the polarized light or the polarized electromagnetic waves and the polarizing material layer is changed (S74). For example, the substrate may be rotated by an angle $\alpha$, which may be approximately 45 degrees, 90 degrees or 180 degrees. As shown in FIG. 8b, the substrate may be horizontally rotated. The angle between the polarization direction of the polarized light or the polarized electromagnetic waves and the polarizing material layer may be an angle between the polarization direction of the polarized light or the polarized electromagnetic and the polarization axis in the first region 13.

Further, the second region is exposed under the polarized light or the polarized electromagnetic waves with the first-polarization direction (S76). As shown in FIG. 8b, a photomask 15' may transmit the polarized light or polarized electromagnetic waves irradiating the second region 14, while block the polarized light or polarized electromagnetic waves irradiating the first region 13. Thus, the polarized light or the polarized electromagnetic waves transmitted from the photomask 15' may irradiate the second region 14 and align the polarizing material layer in the second region 14. The second region 14 may a polarization axis different from the first-polarization direction. For example, the angle between the polarization axis in the second region 14 and the polarization axis in the first region 13 may be the angle $\alpha$.

In the disclosed embodiments, the polarized light or the polarized electromagnetic waves adopted to align the polarizing material layer in the first region and the polarizing material layer in the second region may have the same polarization direction, i.e., the first-polarization direction. The substrate may be rotated by a certain degree, and the polarizing material layer coated on the substrate may also be rotated by the certain degree accordingly. Thus, the angle between the polarization direction of the polarized light or the polarized electromagnetic waves and the polarizing material layer may be changed.

That is, the first region 13 and the second region 14 may be respectively irradiated by the polarized light or the polarized electromagnetic waves with a different polarization direction. Thus, the polarization axis of the second region may be different from the polarization axis of the first region, and two regions with different polarization directions may be realized in one polarization material layer Eventually a polarizer having two regions may be realized, in which each region may have a different polarization axis. Although only two regions (the first region and the second region) are used for illustrative purposes, the polarizer may be divided into more than two regions.

Figure 9A:
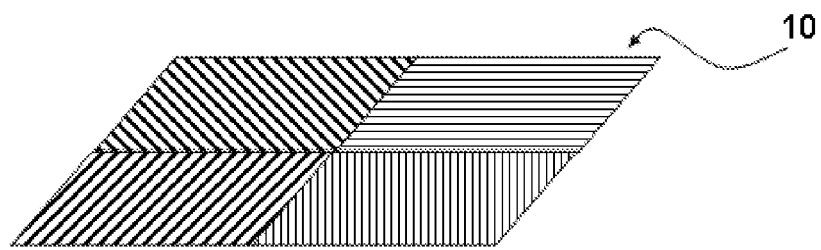
FIG. 9a illustrates a top view of another exemplary polarizer consistent with disclosed embodiment.

FIG. 9a illustrates a top view of an exemplary polarizer consistent with disclosed embodiment. As shown in FIG. 9a, the polarizer 10 may have multiple polarization directions (e.g., 4) in multiple regions (e.g., 4), and each region may have a different polarization direction. In certain embodiments, the polarizer 10 may have three regions, four regions or even more regions.

Figure 9B:
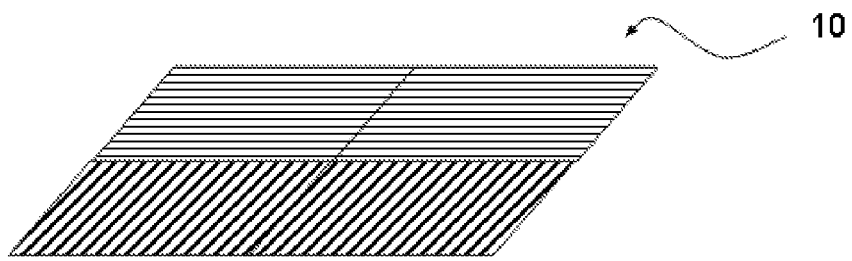
FIG. 9b illustrates a top view of another exemplary polarizer consistent with disclosed embodiment.

FIG. 9b illustrates a top view of another exemplary polarizer consistent with disclosed embodiment. As shown in FIG. 9b, every row in the polarizer 10 may form a region, in which every row may have a same polarization direction.

Figure 9C:
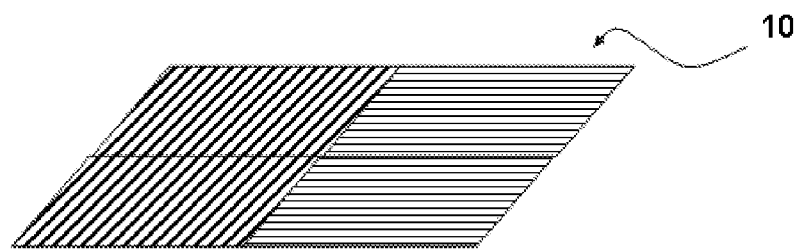
FIG. 9c illustrates a top view of another exemplary polarizer consistent with disclosed embodiment.

FIG. 9c illustrates a top view of another exemplary polarizer consistent with disclosed embodiment. As shown in FIG. 9c, every column in the polarizer 10 may form a region, in which every column may have a same polarization direction.

Figure 9D:
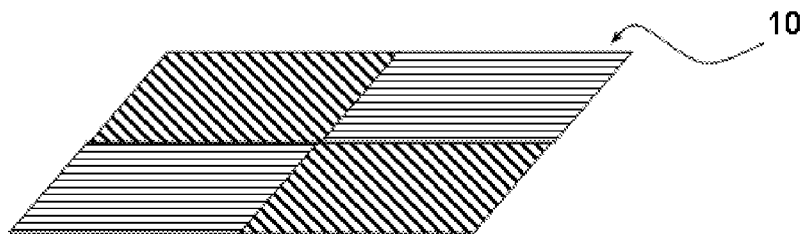
FIG. 9d illustrates a top view of another exemplary polarizer consistent with disclosed embodiment.

FIG. 9d illustrates a top view of another exemplary polarizer consistent with disclosed embodiment. As shown in FIG. 9d, different regions in the polarizer 10 may have a same polarization direction. Two regions with different polarization directions may be alternately arranged.

The region size and the region combination in the polarizer 10 may vary to meet a required effect in the practical applications. For illustrative purposes, only four regions are disposed in the polarizer 10. However, the polarizer 10 may include any number of regions in the practical manufacturing.

Further, the area of the first region and the area of the second region may be the same. Thus, the radiation of the polarized light or the polarized electromagnetic waves transmitted through the polarizer may be equal in both directions. In the practical applications, such a configuration may have advantages like good controllability, convenience, wide application range and etc. When employed in a display panel, one region in the polarizer may correspond to one pixel unit, a plurality of pixel units, a column of pixel units or a row of pixel units.

Figure 10:
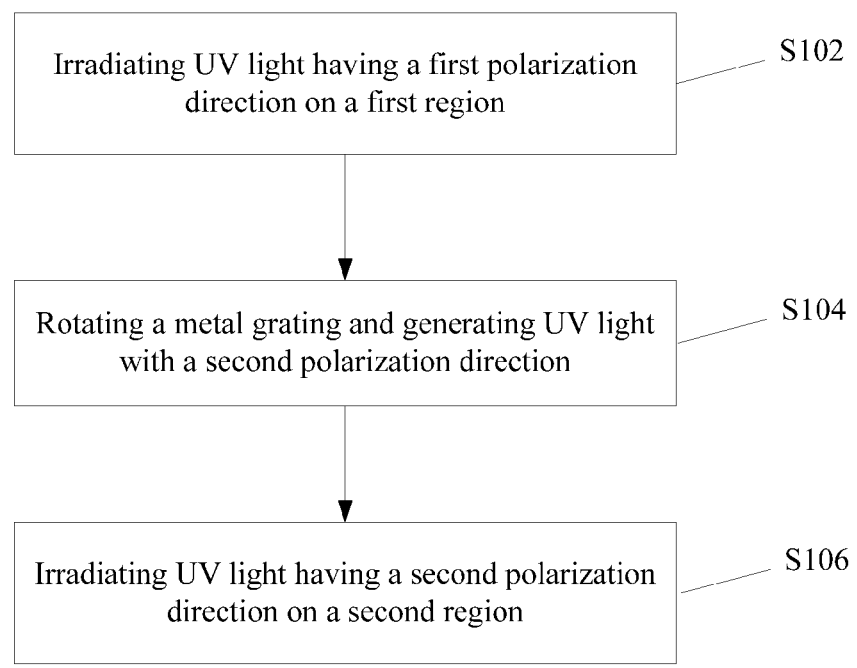
FIG. 10 illustrates a flow chart of another exemplary light or electromagnetic wave irradiation in an exemplary polarizer fabrication process in FIG. 6 consistent with disclosed embodiments.
Figure 11A:
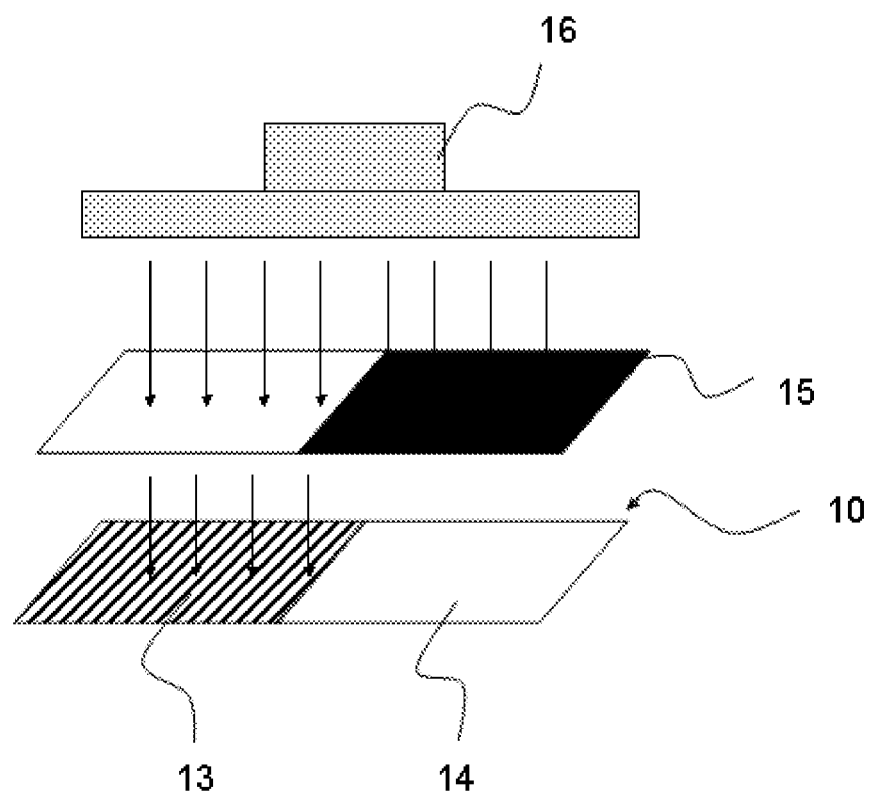
FIGS. 11a-11b illustrate schematics of an exemplary light or electromagnetic wave irradiation in FIG. 10 in an exemplary polarizer fabrication process in FIG. 6 consistent with disclosed embodiments.
Figure 11B:
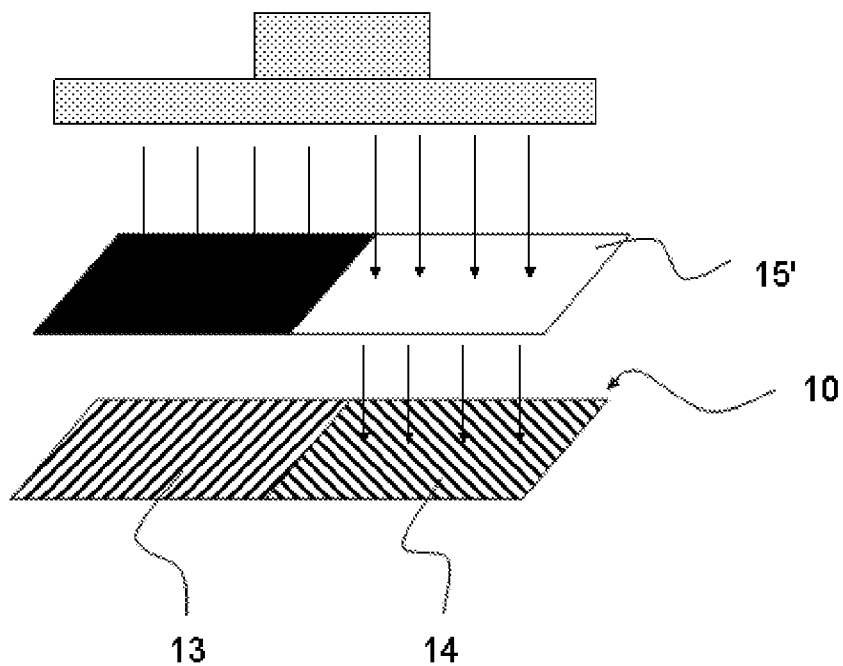

FIG. 10 illustrates a flow chart of another exemplary light or electromagnetic wave irradiation in an exemplary polarizer fabrication process in FIG. 6 consistent with disclosed embodiments. FIGS. 11a-11b illustrate schematics of an exemplary light or electromagnetic wave irradiation in FIG. 10 in an exemplary polarizer fabrication process in FIG. 6 consistent with disclosed embodiments.

As shown in FIG. 10, at the beginning, a first region is exposed under polarized light or polarized electromagnetic waves with a first-polarization direction (S102). As shown in FIG. 11a, the light electromagnetic waves source 16 may emit polarized light or polarized electromagnetic waves. In another embodiment, the light electromagnetic waves source 16 may emit unpolarized light or unpolarized electromagnetic waves. The polarizing material layer may include the first region 13 and the second region 14. The light or the electromagnetic waves may first go through a metal grating and then irradiate the polarizing material layer. The light or the electromagnetic waves transmitted through the metal grating may have a first polarization direction.

The photomask 15 may transmit the polarized light or the polarized electromagnetic waves irradiating the first region 13, while block the polarized light or the polarized electromagnetic waves irradiating the second region 14. Thus, the light or the electromagnetic waves with the first polarization direction may irradiate the first region 13 and align the polarizing material layer in the first region 13.

Returning to FIG. 10, after irradiating the light or the electromagnetic waves with the first polarization direction on the first region, the metal grating is rotated by a certain angle (S104). Thus, the light or the electromagnetic waves transmitted through the rotated metal grating may have a second polarization direction. The metal grating may be rotated by approximately 45 degrees, 90 degrees or 180 degrees.

Further, the second region is exposed under the light or electromagnetic waves with the second-polarization direction (S106). As shown in FIG. 11b, the photomask 15' may transmit the polarized light or polarized electromagnetic waves irradiating the second region 14, while block the polarized light or polarized electromagnetic waves irradiating the first region 13. Thus, the polarized light or the polarized electromagnetic waves with the second polarization direction may irradiate the second region 14 and align the polarizing material layer in the second region 14.

Thus, two regions with different polarization directions may be realized in one polarization material layer. Eventually a polarizer having two regions with different polarization axes may be realized. Although only two regions (the first region and the second region) are used for illustrative purposes, the polarizer may be divided into more than two regions in the practical manufacturing.

The metal gating may have a comparable or identical dimension as the first region and/or the second region. A large-size glass panel may not have a square shape in generally and the layout may not centrally symmetrical, thus, a large-size grating may require a complicated fabrication process. Through using the metal grating with the comparable or identical dimension as the first region and/or the second region, different regions may be respectively irradiated by the polarized light or the polarized electromagnetic waves.

For example, a first region may be irradiated by light or electromagnetic waves with a first direction, a second region may be irradiated by light or electromagnetic waves with a second direction, a third region may be irradiated by light or electromagnetic waves with a third direction and so on. That is, through a Stepping Exposure method, different regions may be respectively irradiated by the polarized light or polarized electromagnetic waves.

Figure 12:
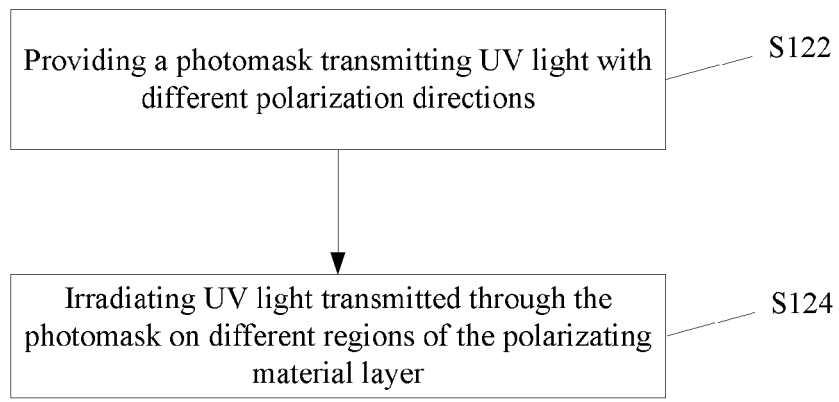
FIG. 12 illustrates a flow chart of another exemplary light or electromagnetic wave irradiation in an exemplary polarizer fabrication process in FIG. 6 consistent with disclosed embodiments.

FIG. 12 illustrates a flow chart of another exemplary light or electromagnetic wave irradiation in an exemplary polarizer fabrication process in FIG. 6 consistent with disclosed embodiments. As shown in FIG. 12, at the beginning, a photomask having a third-region and a fourth-region is provided (S122). The third-region in the photomask may correspond to a first region in a polarizer, and the fourth-region in the photomask may correspond to a second region in the polarizer. Light or electromagnetic waves transmitted through the photomask may become polarized. In addition, the polarized light or the polarized electromagnetic waves transmitted through the third-region and the fourth-region may have different polarization axes.

Then the polarizing material layer may be exposed to the light or electromagnetic waves transmitted through the photomask, and a polarizer having different polarization directions in different regions may be formed (S124). The photomask may be a metal grating, and third-region in the metal grating and the fourth-region in the metal grating may have different metal slit directions. After transmitting through the different regions in the metal grating, unpolarized light or unpolarized electromagnetic waves may become polarized light with different polarization directions. Further, at least one of the third-region and the fourth-region may include a phase delayer, which may change the polarization direction of the unpolarized light or unpolarized electromagnetic waves incident on the metal grating.

In the disclosed embodiments, the metal gating may have an identical dimension as the first region and/or the second region. In the present disclosure, the light or the electromagnetic waves may include but not limited to, ultraviolet (UV) light, infrared light, far infrared light, electron beams, X-rays, ion beams, electromagnetic waves, etc. Further, the light or the electromagnetic waves may include any light or electromagnetic waves which is able to align the base material and/or the polarizing material.

In the disclosed embodiments, the base material and/or the polarizing material, or the polarization material layer including the base material and the polarizing material may be irradiated by polarized UV light, in which the technologies may be mature, the response of the base material and/or the polarizing material may be high and the induced alignment of the base material and/or the polarizing material may be accurate. In certain embodiments, the base material and/or the polarizing material, or the polarization material layer including the base material and the polarizing material may be irradiated by one or more of infrared light, far infrared light, electron beams, ion beams, X-ray and electromagnetic waves radiation, etc.

Figure 13:
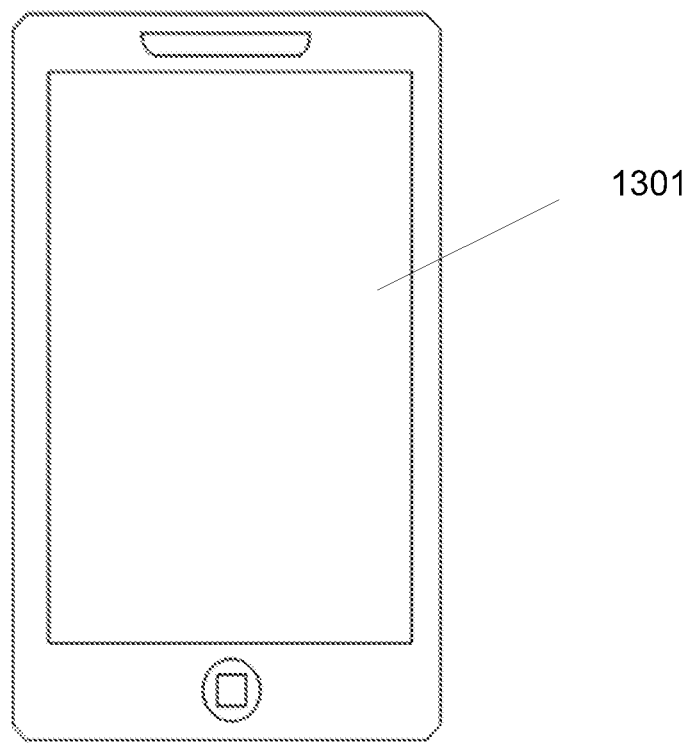
FIG. 13 illustrates a top view of an exemplary display device consistent with disclosed embodiments.

The present invention further provides a display device including the disclosed multi-axis or regionalized polarizers. FIG. 13 illustrates a top view of an exemplary display device consistent with disclosed embodiments. The display device 1300 includes an exemplary multi-axis or regionalized polarizer 1301 consistent with disclosed embodiments. In addition to liquid crystal displays, the disclosed polarizers may also be applied to various types of display devices and optical devices, such as 3D displays, electronic paper (E-paper), and organic light-emitting diode (OLED) displays etc.

The present disclosure provides high efficiency and low cost structures and fabrication techniques of the multi-axis or regionalized polarizers. The polarizers fabricated by the optical alignment techniques may be disposed at any layer of the display panel. Thus, good flexibility and improved production efficiency may be realized in the fabrication of the display panel and, meanwhile, the slim display panel may be obtained.

Because the stretching may not be needed to enable the polarizing capability of the polarizer, warping and cracking may be prevented and the reliability of the polarizer may be improved. Because a water protection layer may not be required in the polarizer, the polarizer may be thinner and lighter. When both the polarizing-material and the base-material have the optical alignment capability, the base-material may guide the alignment of the polarizing-material and, meanwhile, the polarizing-material may have a synergistic effect on the alignment of the base-material. The fabricated multi-axis polarizer may have a desired regionalization accuracy and stability.

Further, because the disclosed display panels and the display devices may include any one of the disclosed polarizers, the disclosed display panels and the display devices may also have the same advantages as the disclosed polarizers.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A display panel, comprising:
a first substrate, wherein the first substrate is a color film substrate including a color film, a first organic layer, and a first alignment layer sequentially disposed on an inner surface of the first substrate; and
a second substrate arranged opposite to the first substrate, wherein the second substrate is an array substrate including a gate layer, a semiconductor layer, a second organic layer, and a second alignment layer sequentially disposed on an inner surface of the second substrate, the inner surface of the second substrate facing the inner surface of the first substrate;
wherein the first organic layer is an overcoat layer made of resin, and the second organic layer is a planarization layer made of resin,
a polarizing-material is doped into the first organic layer and the second organic layer, and the polarizing-material includes a dichroic dye having an optical alignment capability, and
the dichroic dye includes one or more of a compound having a chemical structural formula (2) and a compound having a chemical structural formula (3),

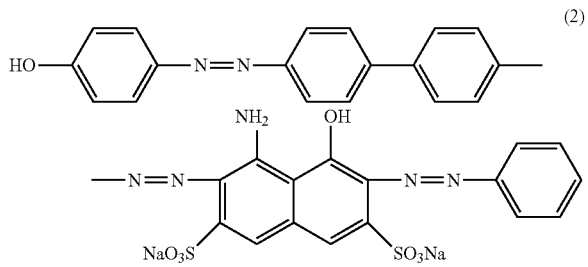

(2)

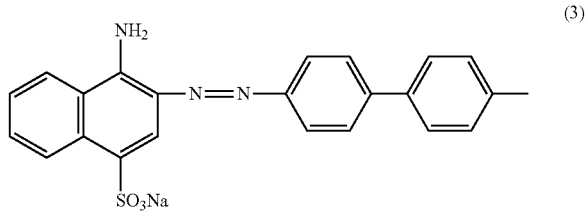

(3)

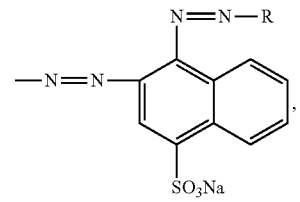

(3)

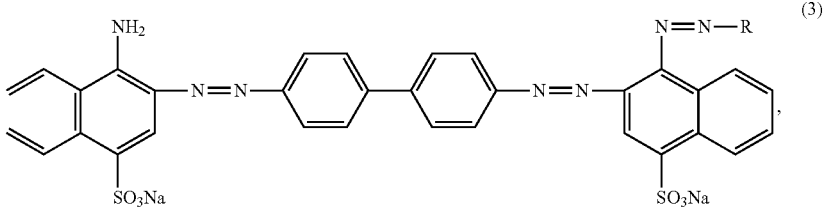

(3)

where R includes one of

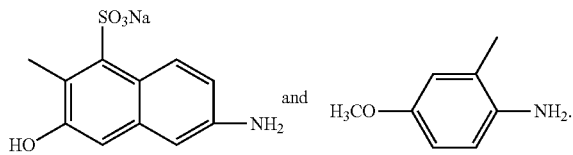

2. A display device including a display panel according to claim 1.

3. The display panel according to claim 1, wherein:
the dichroic dye contains an azo group or a trans-stilbene group.

4. The display panel according to claim 3, wherein:
the dichroic dye includes one or more of azo dye, anthraquinone dye, biphenyl dye, tri-phenyl methane dye and derivative, single or multi-methane dye, polycyclic dye and trans-stilbene dye.

5. The display panel according to claim 4, wherein:
the dichroic dye incorporates electron donor groups or electron acceptor groups at molecular terminals.

6. The display panel according to claim 1, further including:
a base-material doped into the first organic layer and the second organic layer, wherein the base-material has the optical alignment capability.

7. The display panel according to claim 6, wherein:
the base-material is polyimide having cyclobutane groups, poly-cinnamoyl derivatives or azo-type optical alignment material.

8. The display panel according to claim 1, wherein:
the color film and the first organic layer are disposed on the inner surface of the first substrate, and
the gate layer, the semiconductor layer, and the second organic layer are disposed on the inner surface of the second substrate.

9. The display panel according to claim 1, wherein:
the first organic layer and the second organic layer which are doped with the polarizing-material include at least one first region having a first polarization axis and at least one second region having a second polarization axis, and
a direction of the first polarization axis is configured to be different from a direction of the second polarization axis, such that a wide viewing angle is achieved in the display panel.

10. The display panel according to claim 9, wherein:
the first organic layer and the second organic layer which are doped with the polarizing-material further include at least one third region having a third polarization axis and at least one fourth region having a fourth polarization axis,
wherein a direction of the third polarization axis is different from the direction of the first polarization axis and the direction of the second polarization axis, and a direction of the fourth polarization axis is different from the direction of the first polarization axis and the direction of the second polarization axis.

11. A fabrication method for a polarizer in a display panel comprising a first substrate, wherein the first substrate is a color film substrate including a color film, a first organic layer, and a first alignment layer sequentially disposed on an inner surface of the first substrate; and a second substrate arranged opposite to the first substrate, wherein the second substrate is an array substrate including a gate layer, a semiconductor layer, a second organic layer, and a second alignment layer sequentially disposed on an inner surface of the second substrate, the inner surface of the second substrate facing the inner surface of the first substrate; wherein the first organic layer is an overcoat layer made of resin, and the second organic layer is a planarization layer made of resin, wherein the fabrication method for the polarizer comprises:
providing a substrate;
forming a polarizing material layer by coating a based-material doped with a polarizing-material or a based-material precursor doped with a polarizing-material on the substrate, wherein the polarizing material layer includes at least one first region and at least one second region, and the polarizing-material is aligned to have a polarizing capability when irradiated by light or electromagnetic waves;
providing a first photomask transparent to the at least one first region;
irradiating light or electromagnetic waves having a first polarization direction on the at least one first region, wherein the irradiated at least one first region has a first polarization axis;
rotating the substrate in horizontal direction, such that an angle between the first polarization direction of the light or the electromagnetic waves and a plane of the polarizing material layer is changed;
providing a second photomask transparent to the at least one second region; and
irradiating the light or the electromagnetic waves having the first polarization direction on the at least one second region, wherein the irradiated at least one second region has a second polarization axis, and a direction of the first polarization axis is different from a direction of the second polarization axis,
wherein the polarizing material layer is the first organic layer and the second organic layer, such that the polarizer is fabricated on the first substrate and the second substrate, and a wide viewing angle is achieved in the display panel comprising the polarizer,
the polarizing-material includes a dichroic dye having an optical alignment capability, and
the dichroic dye includes one or more of a compound having a chemical structural formula (2) and a compound having a chemical structural formula (3),

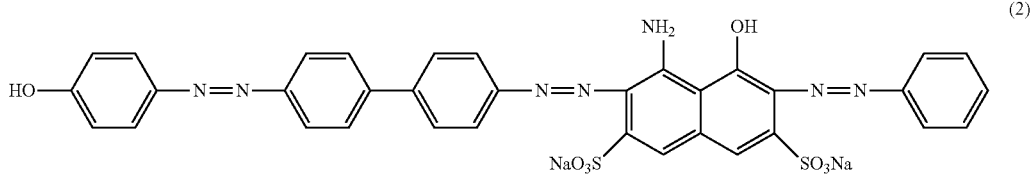

(2)

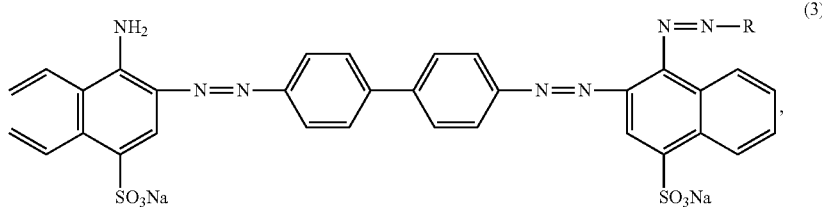

where R includes one of

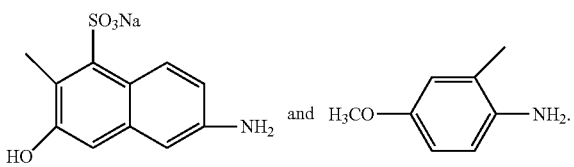

12. The fabrication method according to claim 11, further including:
pre-baking the polarizing material layer;
irradiating the light or the electromagnetic waves transmitted through the photomask on the polarizing material layer; and
post-baking the polarizing material layer.

13. The fabrication method according to claim 12, wherein:
the light or the electromagnetic waves has an energy of approximately 300 mj-1000 mj.

14. The fabrication method according to claim 12, wherein:
the pre-baking has a temperature of approximately 90° C.-130° C. and a time period of approximately 60 s-120 s.

15. The fabrication method according to claim 12, wherein:
the post-baking has a temperature of approximately 210° C.-230° C. and a time period of approximately 20 mins-50 mins.

16. A fabrication method for a polarizer in a display panel comprising a first substrate, wherein the first substrate is a color film substrate including a color film, a first organic layer, and a first alignment layer sequentially disposed on an inner surface of the first substrate; and a second substrate arranged opposite to the first substrate, wherein the second substrate is an array substrate including a gate layer, a semiconductor layer, a second organic layer, and a second alignment layer sequentially disposed on an inner surface of the second substrate, the inner surface of the second substrate facing the inner surface of the first substrate; wherein the first organic layer is an overcoat layer made of resin, and the second organic layer is a planarization layer made of resin, wherein the fabrication method for the polarizer comprises:
providing a substrate;
forming a polarizing material layer by coating a based-material doped with a polarizing-material or a based-material precursor doped with a polarizing-material on the substrate, wherein the polarizing material layer includes at least one first region and at least one second region, and the polarizing-material is aligned to have a polarizing capability when irradiated by light or electromagnetic waves;
providing a first photomask transparent to the at least one first region;
irradiating light or electromagnetic waves having a first polarization direction on the at least one first region, wherein the irradiated at least one first region has a first polarization axis;
providing a second photomask transparent to the at least one second region; and
irradiating light or electromagnetic waves having a second polarization direction on the at least one second region, wherein the irradiated at least one second region has a second polarization axis, and a direction of the first polarization axis is different from a direction of the second polarization axis,
wherein the polarizing material layer is the first organic layer and the second organic layer, such that the polarizer is fabricated on the first substrate and the second substrate, and a wide viewing angle is achieved in the display panel comprising the polarizer,
the polarizing-material includes a dichroic dye having an optical alignment capability, and
the dichroic dye includes one or more of a compound having a chemical structural formula (2) and a compound having a chemical structural formula (3),

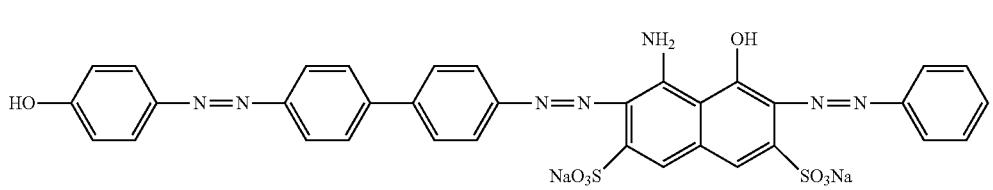

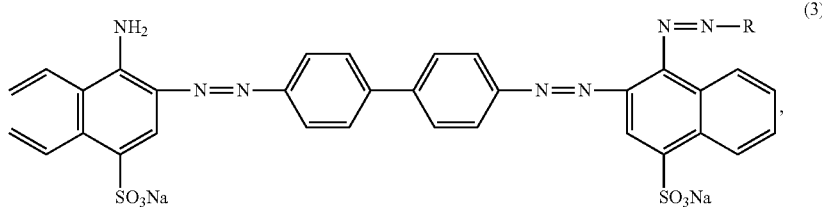

where R includes one of

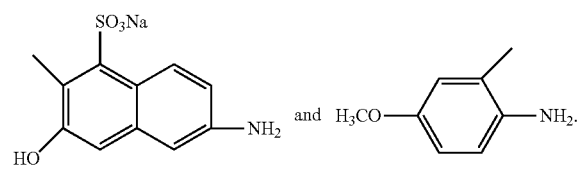

17. The fabrication method according to claim 16, further including:
providing a metal grating converting unpolarized light or unpolarized electromagnetic waves incident on the metal grating to polarized light or polarized electromagnetic waves, such that the light or the electromagnetic waves transmitted through the metal grating have the first direction; and
rotating the metal grating by a certain angle after irradiating the light or the electromagnetic waves having the first polarization direction on the at least one first region, such that the light or the electromagnetic waves transmitted through the metal grating has the second polarization direction.

18. The fabrication method according to claim 17, wherein:
the metal grating has a comparable or an identical dimension as the at least one first region or the at least one second region.

19. A fabrication method for a polarizer in a display panel comprising a first substrate, wherein the first substrate is a color film substrate including a color film, a first organic layer, and a first alignment layer sequentially disposed on an inner surface of the first substrate; and a second substrate arranged opposite to the first substrate, wherein the second substrate is an array substrate including a gate layer, a semiconductor layer, a second organic layer, and a second alignment layer sequentially disposed on an inner surface of the second substrate, the inner surface of the second substrate facing the inner surface of the first substrate; wherein the first organic layer is an overcoat layer made of resin, and the second organic layer is a planarization layer made of resin, wherein the fabrication method for the polarizer comprises:
providing a substrate;
forming a polarizing material layer by coating a based-material doped with a polarizing-material or a based-material precursor doped with a polarizing-material on the substrate, wherein the polarizing material layer includes at least one first region and at least one second region, and the polarizing-material is aligned to have a polarizing capability when irradiated by light or electromagnetic waves;
providing a photomask having at least one third-region corresponding to the at least one first region and at least one fourth-region corresponding to the at least one second region; and
irradiating light or electromagnetic waves transmitted through the photomask on the at least one first region and the at least one second region,
wherein the photomask converts unpolarized light or unpolarized electromagnetic waves incident on the photomask to polarized light or polarized electromagnetic waves, and the light or the electromagnetic waves transmitted through the at least one third-region and the at least one fourth-region have different polarization directions,
wherein the irradiated at least one first region has a first polarization axis, the irradiated at least one second region has a second polarization axis, and a direction of the first polarization axis is different from a direction of the second polarization axis,
wherein the polarizing material layer is the first organic layer and the second organic layer, such that the polarizer is fabricated on the first substrate and the second substrate, and a wide viewing angle is achieved in the display panel comprising the polarizer, and
wherein the polarizing-material includes a dichroic dye having an optical alignment capability, and the dichroic dye includes one or more of a compound having a chemical structural formula (2) and a compound having a chemical structural formula (3),

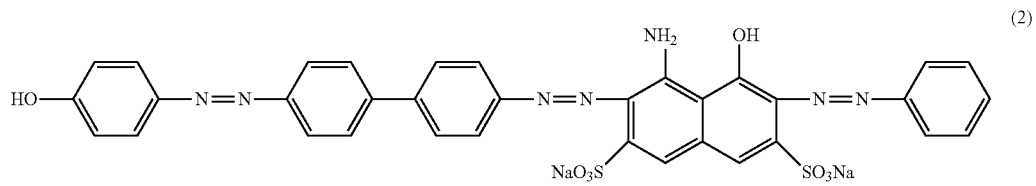

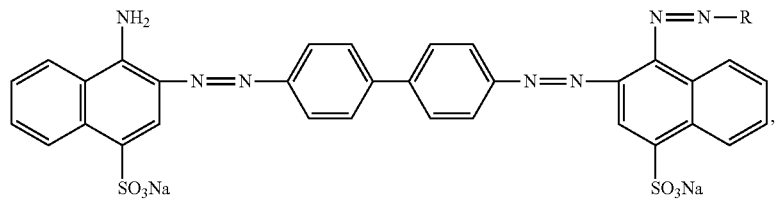
(3)
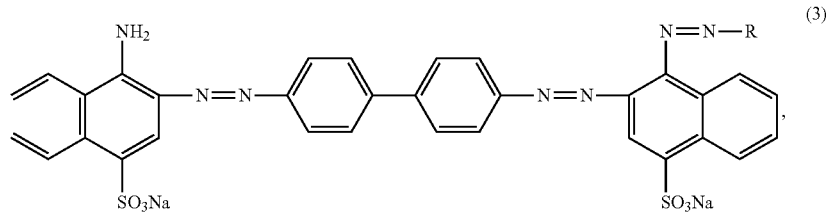
(3)
where R includes one of
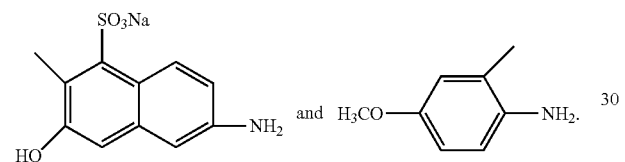
* * * * *